(12) United States Patent
Carsello et al.

(10) Patent No.: US 7,203,254 B2
(45) Date of Patent: Apr. 10, 2007

(54) METHOD AND SYSTEM FOR SYNCHRONIZING IN A FREQUENCY SHIFT KEYING RECEIVER

(75) Inventors: Stephen R. Carsello, Plantation, FL (US); Mark A. Goldberg, Davie, FL (US)

(73) Assignee: Motorola, Inc., Schaumburg, IL (US)

( * ) Notice: Subject to any disclaimer, the term of this patent is extended or adjusted under 35 U.S.C. 154(b) by 27 days.

(21) Appl. No.: 10/397,027

(22) Filed: Mar. 25, 2003

(65) Prior Publication Data

US 2004/0190663 A1 Sep. 30, 2004

(51) Int. Cl.
*H04L 27/14* (2006.01)
*H03D 3/00* (2006.01)

(52) U.S. Cl. .................. 375/334; 375/343; 375/354

(58) Field of Classification Search ........... 375/354, 375/356, 357, 366, 334, 335, 343, 227, 326, 375/344, 362, 365, 368; 370/503; 327/331; 455/205, 192.1, 192.2, 67.13, 226.3
See application file for complete search history.

(56) References Cited

U.S. PATENT DOCUMENTS

| | | | | |
|---|---|---|---|---|
| 4,599,732 A * | 7/1986 | LeFever | ............ | 375/346 |
| 5,291,081 A * | 3/1994 | Takeuchi et al. | ............ | 327/47 |
| 5,740,204 A * | 4/1998 | Nagashima | ............ | 375/341 |
| 5,818,882 A * | 10/1998 | Komatsu | ............ | 375/344 |
| 5,852,638 A * | 12/1998 | Chen et al. | ............ | 375/344 |
| 5,940,454 A * | 8/1999 | McNicol et al. | ............ | 375/347 |
| 6,023,477 A * | 2/2000 | Dent | ............ | 370/509 |
| 6,047,033 A * | 4/2000 | Chen | ............ | 375/326 |
| 6,104,767 A * | 8/2000 | Atarius et al. | ............ | 375/344 |
| 6,178,207 B1 * | 1/2001 | Richards et al. | ............ | 375/259 |
| 6,331,996 B1 * | 12/2001 | Lin et al. | ............ | 375/130 |
| 6,459,679 B1 * | 10/2002 | Kim | ............ | 370/208 |
| 6,487,252 B1 * | 11/2002 | Kleider et al. | ............ | 375/260 |
| 6,493,448 B1 * | 12/2002 | Mann et al. | ............ | 379/406.01 |
| 6,606,363 B1 * | 8/2003 | Atarius et al. | ............ | 375/362 |
| 6,628,606 B1 * | 9/2003 | Hong et al. | ............ | 370/208 |
| 6,628,730 B1 * | 9/2003 | Stott et al. | ............ | 375/344 |
| 6,728,326 B1 * | 4/2004 | Fulghum | ............ | 375/365 |
| 6,771,767 B1 * | 8/2004 | Li et al. | ............ | 379/386 |
| 6,934,327 B1 * | 8/2005 | Whited et al. | ............ | 375/225 |
| 2002/0021715 A1* | 2/2002 | Matheus et al. | ............ | 370/480 |
| 2002/0159534 A1* | 10/2002 | Duncan et al. | ............ | 375/260 |

* cited by examiner

*Primary Examiner*—Betsy L. Deppe
(74) *Attorney, Agent, or Firm*—Scott M. Garrett

(57) ABSTRACT

The invention provides a method and apparatus for achieving timing synchronization during signal acquisition and for achieving frequency synchronization in a digital communication receiver after signal acquisition. The invention operates by performing multiple correlations of a received signal, each correlation performed over an symbol interval and correlating the received signal in the symbol interval with a sinusoid of an expected frequency. The correlations are combined to determine a peak and energy, and if the peak to energy ratio is above a threshold, the symbol timing and frequency offset is estimated.

9 Claims, 6 Drawing Sheets

| FADING SPEED (mph) | AVERAGE $E_s/N_0$ (dB) | FREQUENCY ERROR (Hz) | MEAN (Hz) | STD. DEV (Hz) | # VALID/ #TRIALS |
|---|---|---|---|---|---|
| STATIC | 30 | +100 | +100.0 | 0.1 | 500/500 |
| STATIC | 6 | +200 | -200.0 | 0.2 | 477/500 |
| STATIC | 3 | +300 | +300.0 | 0.3 | 119/500 |
| 3 MPH | 30 | -100 | -99.7 | 2.0 | 499/500 |
| 3 MPH | 12 | +200 | +200.6 | 5.2 | 424/500 |
| 3 MPH | 6 | -300 | -299.7 | 2.1 | 195/500 |
| 75 MPH | 30 | +100 | +105.5 | 71.8 | 500/500 |
| 75 MPH | 10 | -200 | 191.6 | 70.3 | 360/500 |
| 75 MPH | 5 | +300 | +301.7 | 73.3 | 195/500 |

*FIG. 9*

METHOD AND SYSTEM FOR SYNCHRONIZING IN A FREQUENCY SHIFT KEYING RECEIVER

TECHNICAL FIELD

This invention is generally related to synchronization for digital communication systems employing frequency key shifting (FSK) modulation. More particularly, an aspect of the invention is applicable for systems using orthogonal, non-coherent, FSK modulation.

BACKGROUND OF THE INVENTION

Digital communication systems can be very sensitive to synchronization error. For instance, phase error can cripple a Quadrature Amplitude Modulation (QAM) system if not controlled to an acceptable level. With non-coherent FSK receivers, it is necessary to acquire and maintain an acceptable level of frequency accuracy in order to properly receive a signal. Synchronization may occur in two phases including the acquisition phase and the tracking phase. Even after a receiver acquires a signal, a transmitter may drift off frequency during a message due to such factors as heating of its local oscillator reference. In this case, the receiver is forced to track the transmitter's frequency as the message progresses.

Generally, at least one third of the software for digital communication receivers is devoted to synchronization for both acquisition and tracking of a signal. It is necessary to synchronize a received signal with a transmitted signal with respect to both time and frequency. Performance errors may result from both time and frequency synchronization errors.

Accordingly, a system is needed for achieving time and frequency synchronization between a receiver and a transmitter in an efficient manner.

Such a system may be applicable to any radio incorporating iDen talk-around for the Industrial, Scientific and Medical (ISM) band. The ISM band includes several bands in the radio frequency spectrum. These bands are unlicensed and can be used for a variety of applications. Products incorporating such technology may include two-way radios, cellular phones, and modems.

SUMMARY OF THE INVENTION

Accordingly, in order to overcome the aforementioned deficiencies, an aspect of the invention provides a method for using a digital communication receiver to achieve timing synchronization during acquisition of a signal in the presence of frequency error. The method comprises the steps of: receiving a signal from a transmitter containing a plurality of data slots and a sync word within each transmitted data slot; at each time instant, forming multiple correlations, each of the multiple correlations corresponding to a selected sync symbol interval, relative to the current time instant; and correlating the received signal with a sinusoid of an expected frequency for each of the selected sync symbol intervals. The method additionally includes gathering the correlations at each time instant, and phase-correcting them in accordance with the FSK modulation index and known sync symbol pattern, thus forming a vector of multiple phase-corrected sync symbol correlations. The method additionally includes computing the discrete-time Fourier transform of the vector of phase-corrected sync symbol correlations at each time instant, over a set of candidate offset frequencies and forming a sync correlation signal according to the maximum discrete-time Fourier transform amplitude, at each time instant, among the candidate offset frequencies. The method further includes comparing the sync correlation signal to a threshold at each time instant, wherein the threshold is proportional to the energy in the received signal over the time span of a sync signal, relative to the current time instant and, upon detecting that the sync correlation signal has exceeded the threshold, locating the peak of the sync correlation signal, and establishing symbol timing in accordance with said peak.

In yet another aspect, the invention comprises a digital communication receiver capable of achieving timing synchronization in the presence of frequency error during acquisition of a signal. The digital communication receiver comprises: a receiving mechanism adapted to receive a signal containing a plurality of data slots with a sync word within each transmitted data slot; a correlator for forming multiple correlations, each corresponding to a selected sync symbol interval and for correlating the received signal with a sinusoid of an expected frequency for each of the selected sync symbol intervals; and a combiner for gathering and combining the multiple correlations over a set of small offset frequencies, according to the FSK modulation index and known sync symbol pattern. The digital communication receiver additionally includes a peak detector, which forms a sync correlation signal according to the maximum combiner output amplitude, among the candidate offset frequencies, at each time instant; a threshold detector, which, at each time instant, compares the sync correlation signal to a threshold; and a symbol timing estimator, which, upon detecting that the sync correlation has exceeded the threshold, establishes symbol timing in accordance with the peak of the sync correlation signal.

In yet another aspect, the invention comprises a method for achieving frequency synchronization after acquisition of a signal in a digital communication receiver having a symbol timing mechanism. The method comprises coupling to the symbol timing mechanism for the digital communication receiver; formulating a vector of complex-valued symbol correlations for each received slot, wherein each vector element is the correlation of the received signal with a sinusoid of known or estimated symbol frequency during each symbol interval, and where the symbol intervals are determined according to the symbol timing derived from the symbol timing mechanism; and basing the symbol frequencies on known sync symbols and estimated data symbols during the remainder of the slot. The method additionally includes phase-correcting the vector of complex symbol correlations according to the FSK modulation index and estimated symbol pattern for each slot; computing the discrete-time Fourier transform of the vector of phase-corrected symbol correlations, and estimating the frequency offset of the received signal according to the location of the peak magnitude of the Fourier transform vector. Finally, the method includes computing a quality metric for the frequency offset estimate according to the signal-to-noise ratio computed from the Fourier transform magnitude vector.

In yet a further aspect, the invention comprises an apparatus for achieving frequency synchronization in a digital communication receiver after acquisition of a signal. The apparatus comprises a frequency offset estimator for coupling to a symbol timing mechanism, and formulating an offset estimate using known and estimated symbols, and a quality estimating tool for determining a quality of the frequency offset estimate using a signal-to-noise ratio calculation.

In yet a further aspect, the invention comprises an apparatus for achieving timing synchronization for acquisition of a signal and achieving frequency synchronization after acquisition of the signal. The apparatus comprises: a receiving mechanism adapted to receive a signal containing a plurality of data slots with a sync word within each transmitted data slot; and a correlator for forming multiple correlations, each corresponding to a selected sync symbol interval and for correlating the received signal with a sinusoid of an expected frequency for each of the selected sync symbol intervals. The apparatus additionally includes a combiner for gathering and combining the multiple correlations over a set of small offset frequencies according to the FSK modulation index and known sync symbol pattern; a peak detector, which forms a sync correlation signal according to the maximum combiner output amplitude among the candidate offset frequencies, at each time instant; a threshold detector, which, at each time instant, compares the sync correlation signal to a threshold; and a symbol timing estimator, which, upon detecting that the sync correlation has exceeded the threshold, establishes symbol timing in accordance with the peak of the sync correlation signal. The apparatus additionally comprises a frequency offset estimator for formulating an offset estimate using known and estimated symbols and a quality estimating tool for determining a quality of the frequency offset estimate using a signal-to-noise ratio calculation.

In yet a further aspect, the invention comprises a method for achieving timing synchronization for acquisition of a signal and achieving frequency synchronization after acquisition of the signal. The method comprises receiving a signal containing a plurality of data slots with a sync word within each transmitted data slot. The method additionally includes, at each time instant, forming multiple correlations, each of said multiple correlations corresponding to a selected sync symbol interval relative to the current time instant. Also, the method includes correlating the received signal with a sinusoid of an expected frequency for each of the selected sync symbol intervals, and, at each time instant, gathering the correlations and phase-correcting them in accordance with the FSK modulation index and known sync symbol pattern, thus forming a vector of multiple phase-corrected sync symbol correlations. Additionally, the method includes, at each time instant, computing the discrete-time Fourier transform of the vector of phase-corrected sync symbol correlations over a set of candidate offset frequencies, and forming a sync correlation signal according to the maximum discrete-time Fourier transform amplitude, at each time instant, among the candidate offset frequencies. The method further includes, at each time instant, comparing the sync correlation signal to a threshold, where said threshold is proportional to the energy in the received signal over the time span of a sync signal, relative to the current time instant, and, upon detecting that the sync correlation signal has exceeded the threshold, locating the peak of the sync correlation signal, and establishing symbol timing in accordance with said peak. The method additionally includes coupling to the symbol timing mechanism for the digital communication receiver, and for each received slot, formulating a vector of complex-valued symbol correlations, where each vector element is the correlation of the received signal with a sinusoid of a known or estimated symbol frequency during each symbol interval, and where the symbol intervals are determined according to the symbol timing derived from the symbol timing mechanism. Additionally, the method includes basing the symbol frequencies on known sync symbols and estimated data symbols during the remainder of the slot, and phase correcting the vector of complex symbol correlations according to the FSK modulation index and estimated symbol pattern for each slot. Additionally, the method includes computing the discrete-time Fourier transform of the vector of phase-corrected symbol correlations, and estimating the frequency offset of the received signal according to the location of the peak magnitude of the Fourier transform vector. Finally, the method includes computing a quality metric for the frequency offset estimate, according to the signal-to-noise ratio computed from the Fourier transform magnitude vector.

BRIEF DESCRIPTION OF THE DRAWINGS

FIG. 9 is a table documenting performance of the frequency offset estimator.

DETAILED DESCRIPTION

As disclosed herein, a system and method are provided for achieving timing synchronization during acquisition of a signal and for achieving frequency synchronization after acquisition of the signal. The system and method are particularly useful for systems that undergo frequency drift during a message. In one preferred embodiment of the invention, the system and method are implemented in a mode in which mobile devices communicate directly with one another, without the use of a network. In some instances, while the mobile devices may be capable of communicating over a network, the network may become unavailable. This lack of availability may occur due to busy cells or lack of coverage within a given area. A mode in which mobile devices communicate directly is commonly referred to as "Talkaround" or "Direct Mode". This mode allows wireless devices to communicate directly with one another and is similar to ordinary two-way radios.

Figure 1:
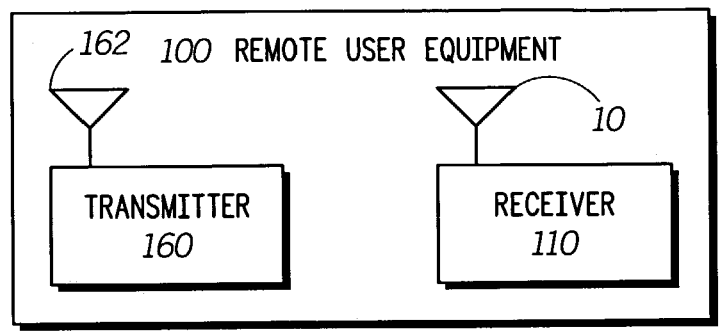
FIG. 1 is a block diagram of user equipment according to an embodiment of the invention.

FIG. 1 is a simple block diagram of a mobile device or remote user equipment 100 for use in an embodiment of the invention. As explained above, the remote user equipment 100 may communicate directly with other remote user equipment. Each remote user equipment 100 may include a transmitter 160 and a receiver 110. The transmitter includes an antenna 162 for transmission of a signal and the receiver 110 includes an antenna 10 for reception of a signal.

Figure 2:
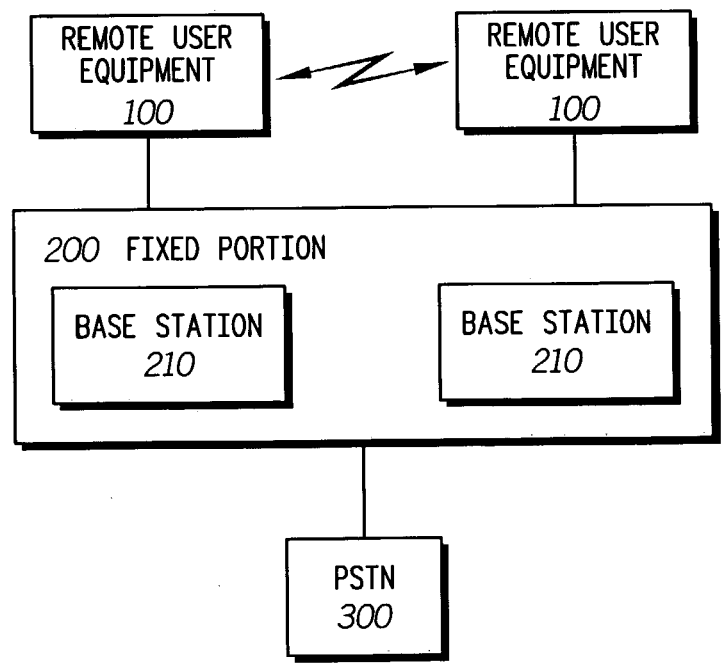
FIG. 2 is a block diagram of a digital communication system environment in which an embodiment of the invention may be implemented.

In another embodiment, the system and method of the invention may operate in a network environment. FIG. 2 is a block diagram of a digital communication system in which the remote user equipment 100 may be used. The remote user equipment 100 communicates with a fixed portion 200 including one or more base stations 210. The fixed portion 200 may be coupled to a network 300 such as public switch telephone networks (PSTN) a local area network (LAN), wide area network (WAN), the Internet or any other type of network. The remote user equipment 100 generally communicates with other remote user equipment with the assistance of the fixed portion 200 and the network 300.

Figure 3:
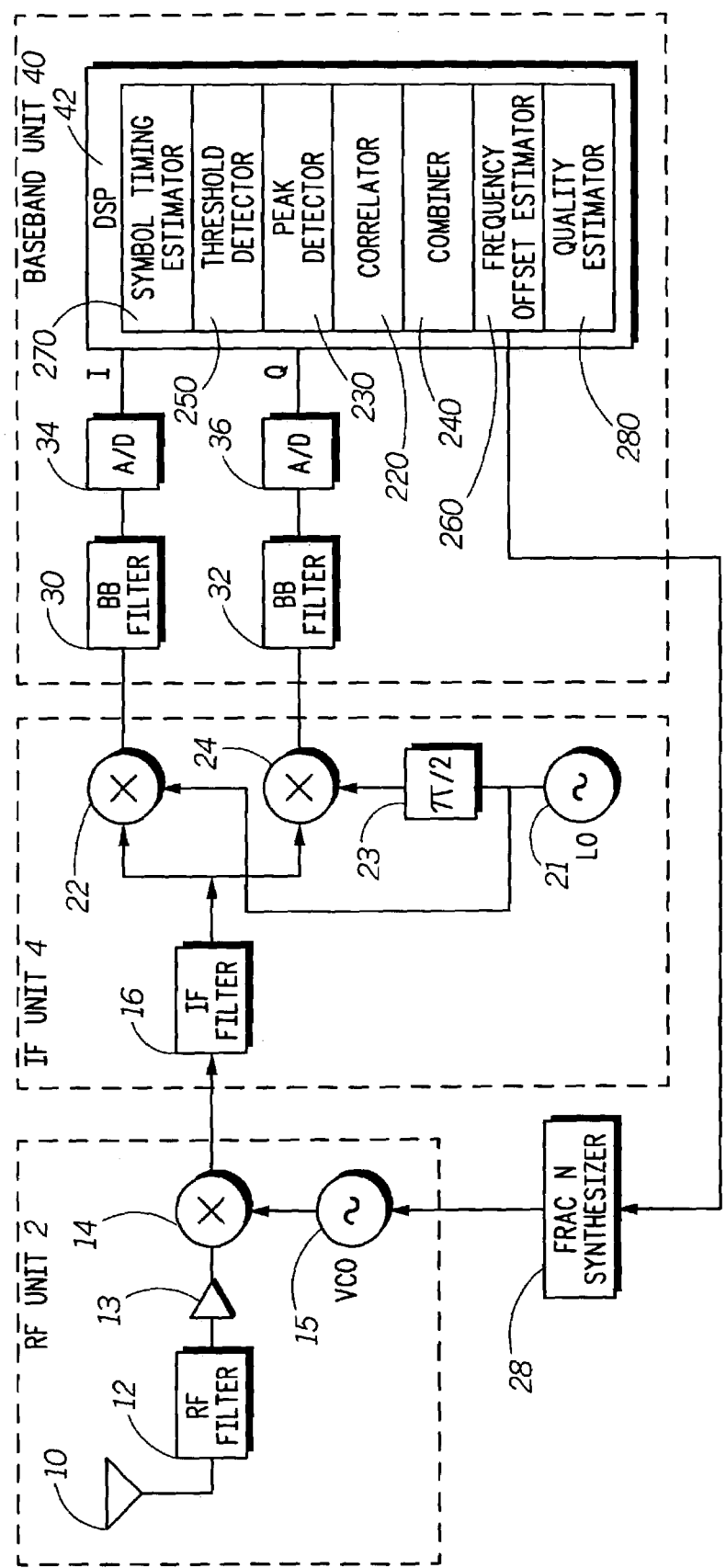
FIG. 3 is a block diagram of an embodiment of a digital communication receiver capable of achieving synchronization.

FIG. 3 shows a receiver architecture contained within remote user equipment 100. The signal is received by an RF unit 2 and is filtered by an RF filter 12 and then amplified by an RF amplifier 13. The amplified RF signal is then translated to an IF frequency by a mixer including a multiplier 14 and a voltage controlled oscillator (VCO) 15. The IF signal from multiplier 14 is sent to an IF unit 4 and is filtered by an IF filter 16 and then translated to baseband by a quadrature down-mixer including multipliers 22 and 24, a local oscillator (LO) 21, a phase shifter 23, and baseband filters 30 and 32. The baseband filters 30 and 32 are contained within a baseband unit 40. The baseband in-phase and quadrature signals, I and Q, are then sampled by data converters 34 and 36 that convert analog voltage signals into discrete numerical sequences. The digital sequences from data converters 34 and 36 are provided to a digital signal processor (DSP) unit 42. The frequency offset estimate from DSP unit 42 is converted into a control signal, which modifies the divide modulus of a Frac-N synthesizer 28. In response, Frac-N synthesizer 28 modifies the oscillating frequency of VCO 15 in accordance to the frequency offset estimate.

The DSP unit 42 may include a correlator 220, peak detector 230, a combiner 240, a threshold detector 250, a frequency offset estimator 260, a symbol timing estimator 270, and a quality estimator 280. Each of these components is described in greater detail below in conjunction with the method of the invention. These components may be software components programmed into an appropriate processor or alternatively may be accomplished with circuitry arranged to accomplish the operations of these components as set forth below in conjunction with the method of the invention.

Figure 4:
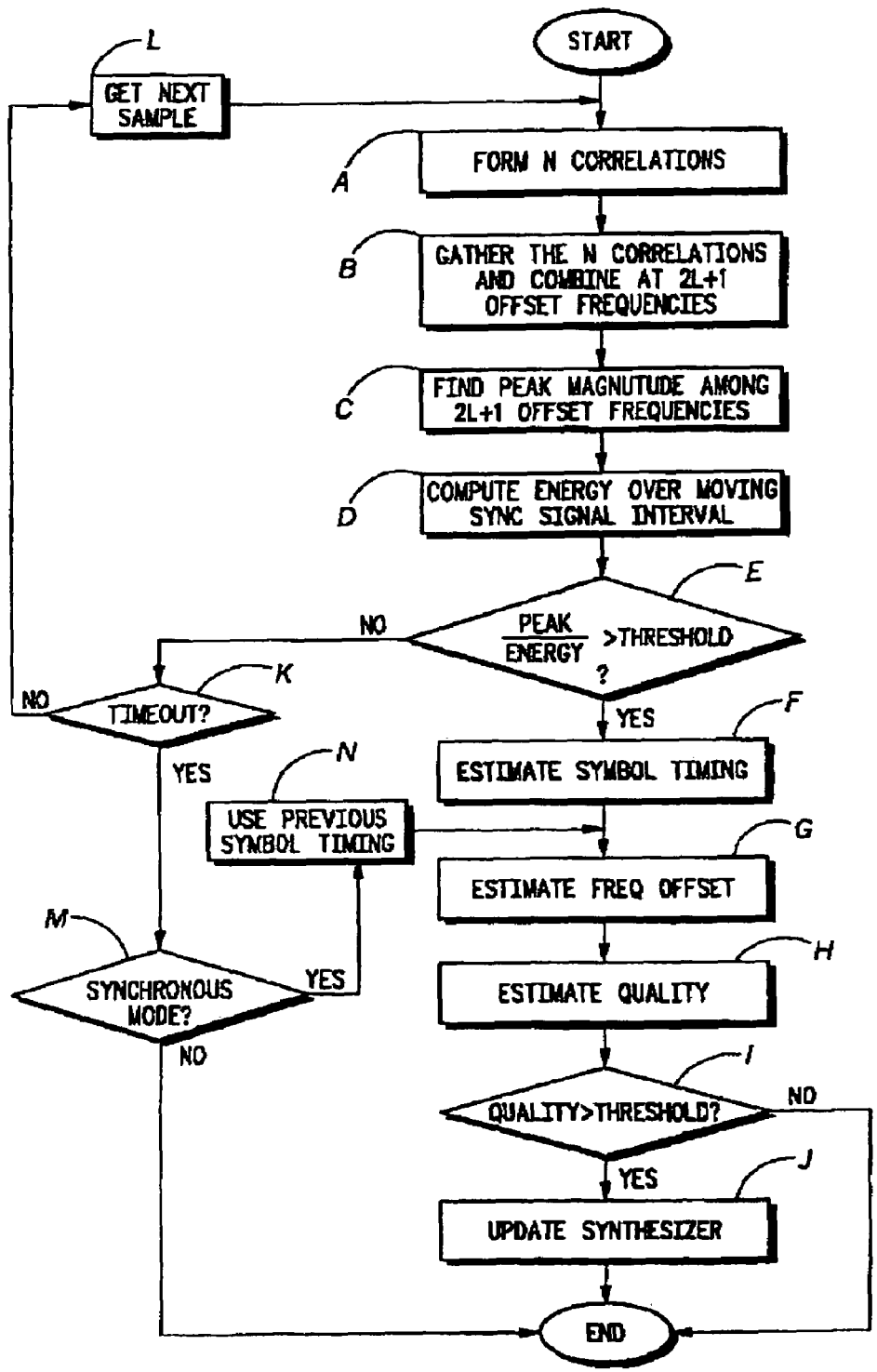
FIG. 4 is a flow chart showing a method for tracking synchronization in a digital communications receiver.

FIG. 4 is a flow chart illustrating the main procedures of the synchronization technique of the invention. In procedure A, the correlator 220 forms N sync symbol correlations according to equation 6. In procedure B, the combiner 240 gathers the correlations, and combines them at 2L+1 offset frequencies according to equations 11, 12, and 13. In procedure C, the peak detector 230 finds a correlation peak among the 2L+1 candidate offset frequencies, according to equation 14. In procedure D, the received signal energy is computed over a moving window associated with the current sync interval under observation according to equation 10. In procedure E, the threshold detector 250 compares the ratio of peak-to-energy to a predetermined threshold. If the threshold test is met, the symbol timing estimator 270 performs symbol timing estimation procedure F, followed by the frequency offset estimator 260 associated with equations 15 and 16, and quality estimator 280 associated with equation 17, marked by procedures G and H, respectively. In procedure I, if the quality exceeds a second predetermined threshold, the synthesizer 28 is adjusted accordingly in procedure J. If, in procedure E, the ratio of peak-to-energy does not exceed the first predetermined threshold, procedure K checks to see if the sync search window has timed out. If not, a new sample is gathered in procedure L, and the entire process repeats from the beginning. If a timeout has occurred, in synchronous mode, the relative symbol timing from the previous slot is used, and the frequency offset estimation procedure G is invoked for the current data slot.

If the current mode of operation is asynchronous, the time out causes the procedure to end.

Figure 5:
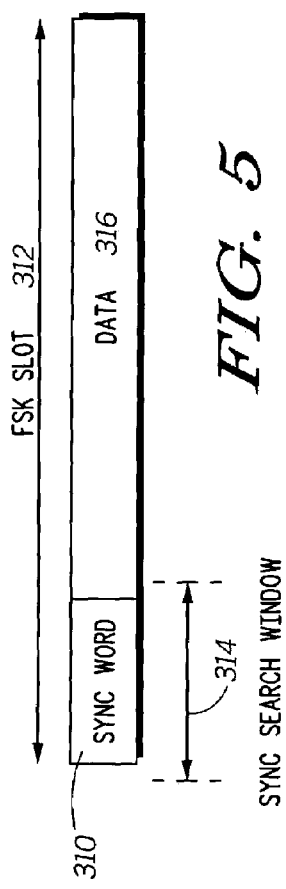
FIG. 5 shows a data slot configuration including a sync word correlation window.

As illustrated in FIG. 5, in a slotted FSK system, a sync word 310 may be transmitted at the beginning of an FSK data slot 312 to provide a receiver such as receiver 110 with a mechanism for tracking a transmitter's symbol timing. The sync word 310 should exhibit good autocorrelation properties, so that it can provide reliable symbol timing information to the receiver 110. For example, a transmitter 160 sends a sync word 310 at the beginning of each slot 312. For each slot 312, the receiver 110 correlates against the sync word 310 within a narrow sync search window 314. The position of the sync search window 314 is based on timing established from previous slots, and should be fairly well aligned with the received sync word 310, as illustrated in FIG. 5. A remainder of the slot 312 may contain data 316.

Sync word correlation c(n) can be described in discrete time by the following equation:

Equation 1:

$$c(n) = \left| \frac{1}{NN_s} \sum_{m=0}^{NN_s-1} r(m+n-NN_s+1)s^*(m) \right|^2$$

where N is the number of symbols in the sync word 310, $N_s$ is the number of samples per symbol, $\{r(n)\}$ is the complex-valued, received sample sequence, and $\{s(n)\}$ is an undistorted template of the complex-valued, transmitted sync signal. Once c(n) exceeds a threshold, a sync "hit" has occurred. Upon finding a sync hit, the receiver 110 performs a search for a peak correlation so that symbol timing can be estimated.

To illustrate the need for a robust sync word correlator in the presence of small frequency errors, assume that the received signal is a noiseless and distortionless version of the transmitted signal, with the exception of a small frequency offset "$\omega_0$" from the transmitted signal. Also, for FSK signals, the constant envelope property |s(n)|=A, where A is constant, applies. Finally, assume that the correlation is applied at a time $n_0$, which happens to align exactly with the sync word 310, in which case, the sync correlation becomes:

Equation 2:

$$c(n_0) = \left| \frac{1}{NN_s} \sum_{m=0}^{NN_s-1} s(m)e^{j\omega_0 m}s^*(m) \right|^2$$

$$= \left| \frac{A^2}{NN_s} \sum_{m=0}^{NN_s-1} e^{j\omega_0 m} \right|^2$$

$$= \left[ \frac{A^2}{NN_s} \frac{\sin(NN_s\omega_0/2)}{\sin(\omega_0/2)} \right]^2$$

Inspection of this expression reveals that zero energy is present at the sync correlator output whenever:

Equation 3:

$$\frac{NN_s\omega_0}{2} = \pi k$$

where k is any non-zero integer.

As an example, for a digital communication system with a-baud rate of 3200 symbols/sec, and with N=8 symbols per sync word, a frequency error as small as 400 Hz will result in zero energy out of the sync correlator. In fact, errors as small as 200 Hz will cause significant signal loss, and will severely degrade a receiver's ability to detect a sync word 310. Accordingly, a solution is needed for dealing with the sync word detection problem in the presence of small frequency errors.

For M-ary FSK signals, let the sync word symbol sequence be represented by the length-N vector $\vec{u}$, where each vector element is contained in the set $$u_m \epsilon [1-M, 3-M, \ldots, M-3, M-1] \quad \text{Equation 4}$$

Let the constant parameter h represents the modulation index. The sync word correlation of Equation 1 can then be expressed by the set of equations 5, 6, and 7

Equation 5:

$$c(n) = \left| \frac{1}{N} \sum_{m=0}^{N-1} \exp[-j\theta_m(\vec{u})]\lambda[n+(m+1-N)N_s, u_m] \right|^2$$

Equation 6:

$$\lambda(n, u) = \frac{1}{N_s} \sum_{k=0}^{N_s-1} r(k+n+1-N_s)\exp\left(-j\frac{\pi u h}{N_s}k\right)$$

Equation 7:

$$\theta_m(\vec{u}) = \begin{cases} 0 & m = 0 \\ \pi h \sum_{i=0}^{m-1} u_i & m > 0 \end{cases}$$

These equations illustrate a "divide-and-conquer" strategy, which is significantly less complex than a brute-force correlation. In the divide and conquer strategy, the correlation is divided into N smaller correlations, represented by equation 6.

As can be seen in equation 6, at each time n, the smaller correlations essentially correlate the received signal with a sinusoid of an expected frequency, with said expected frequency being determined by the known sync symbol u of interest, for each respective sync symbol interval. The combiner 240 gathers and combines the correlations according to equation 5, which accounts for the expected starting phase, given by equation 7, of each sync symbol.

Figure 6:
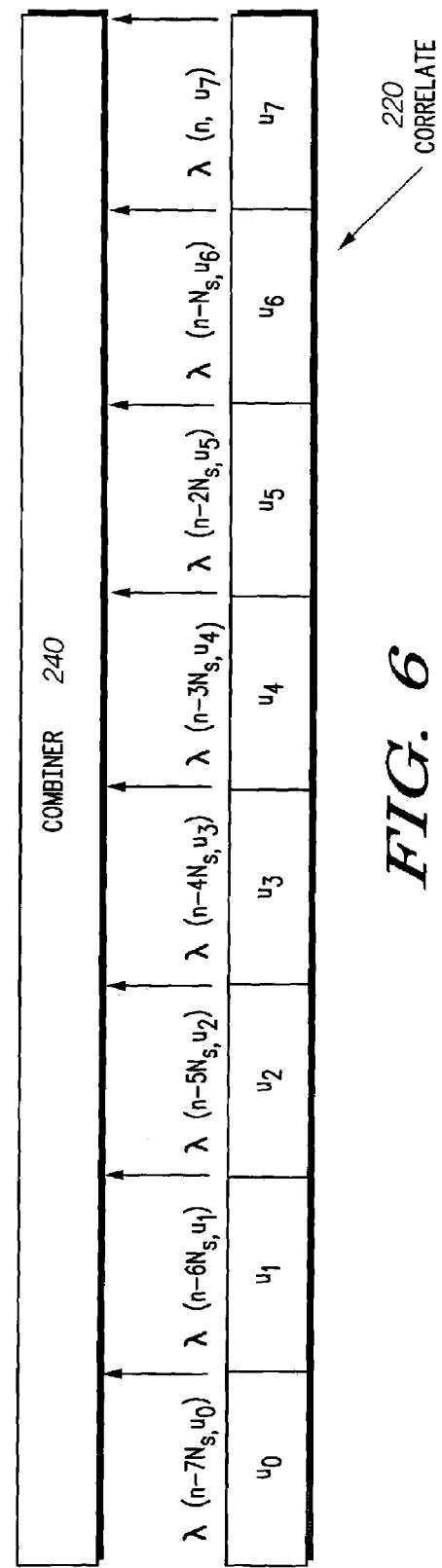
FIG. 6 is a block diagram showing the operation of a correlator and a combiner.

FIG. 6 illustrates the correlation procedure for a sync word of length N=8 symbols. At a time $n_{eight}$ correlator outputs from the correlator 220 start with $\lambda(n-7N_s, u_0)$ and finish with $\lambda(n, u_7)$. The sync correlator 220 then passes its outputs to the combiner 240 that performs the operation of Equation 5. The symbol correlations of equation 6 can be computed efficiently using the recursive form of the Goertzel algorithm:

Equation 8:

$$\lambda(n, u) = e^{j\frac{\pi u h}{N_s}} \left[ \frac{e^{-j\pi u h}}{N_s} r(n) - \frac{1}{N_s} r(n-N_s) + \lambda(n-1, u) \right]$$

It can be appreciated, by those well versed in the art, that other recursive forms can be used to compute the correlator outputs of equation 6. Different formats may be more appropriate, depending on the method of quantization used in a particular digital signal processor 42.

Furthermore, for the integer modulation index h=1, the phase correction terms may be simplified into the form Equation 9:

$$\exp[-j\theta_m(\vec{u})] = \begin{cases} 1 & m \text{ even} \\ -1 & m \text{ odd} \end{cases}$$

We will use this assumption, leading to Equation 9, for many of the examples that follow.

The sync word correlator 220 and combiner 240 perform the iteration of equation 8 at each expected sync word frequency, and then, for h=1, simply add or subtract appropriate outputs. This method is approximately 5 to 10 times less complex than the brute force approach.

In order to detect the presence of the sync word 310 at the receiver 110, the sync correlation output is compared to a threshold. If the sync correlation of equation 5 exceeds the threshold, the sync word is detected, and the ensuing peak of the sync correlation signal is located in order to establish symbol timing for a given FSK data slot 312. Instead of comparing the sync correlation against a fixed threshold, it is desirable to normalize the sync correlation signal by the received signal energy, prior to threshold detection, where the energy is computed within the same time window as the sync correlation of equation 5. Equivalently, the threshold may be scaled by the energy, and compared directly to the sync correlation signal c(n). This energy, denoted by e(n), is computed recursively also:

Equation 10:

$$e(n) = \sum_{k=0}^{NN_s-1} |r(n+k+1-NN_s)|^2$$

$$= e(n-1) + \frac{1}{NN_s}[|r(n)|^2 - |r(n-NN_s)|^2]$$

Upon detecting the sync word, a search is performed in a small time window following the first sync "hit". Within this window, a peak search over the un-normalized c(n) may be performed in order to locate the symbol boundary and accurately establish symbol timing within the receiver 110 for a given FSK data slot 312.

The above-identified process can also be altered to account for small frequency errors. The illustration below assumes a symbol rate of 3200 baud, a modulation index of h=1 and a sync word length of 8 symbols. Referring back to equations 5 and 9, the sync word correlator forms the following vector, at each time instant n:

Equation 11:

$$\vec{x}(n) = \begin{bmatrix} \lambda(n-7N_s, u_0) \\ -\lambda(n-6N_s, u_1) \\ \lambda(n-5N_s, u_2) \\ -\lambda(n-4N_s, u_3) \\ \lambda(n-3N_s, u_4) \\ -\lambda(n-2N_s, u_5) \\ \lambda(n-N_s, u_6) \\ -\lambda(n, u_7) \end{bmatrix}$$

If there is zero frequency error in the received signal and the received signal is time aligned with the sync word, the vector $\vec{x}$ of equation 11 takes the form of a complex phasor with arbitrary phase. If the received signal is off in frequency, this vector should rotate in phase according to the offset, i.e., the vector looks like a complex sinusoid with a frequency equal to the offset. Distortion may exist due to timing error and energy leakage in the individual correlator outputs. However, these distortions are secondary, provided that the offset is small compared to the symbol rate.

A robust sync detection algorithm computes the following:

Equation 12:

$$c_k(n) = \left| \frac{1}{8} \sum_{m=0}^{7} x_m(n) \exp\left(-j \frac{2\pi m f_k}{3200}\right) \right|^2 \quad -L \leq k \leq L$$

which is simply the energy in the vector $\vec{x}(n)$ at frequencies $\{f_k\}$. For the example under consideration, the frequencies may be set to:

$$f_k = 200 \cdot k \text{ Hz} \quad \text{Equation 13}$$

The sync correlator output for this modified algorithm is then $$c(n) = \max_k[c_k(n)] \quad \text{Equation 14}$$

For L=1, the frequency set is {−200, 0, +200} Hz, which would tolerate up to +/−300 Hz of error with only a small degradation.

Figure 7:
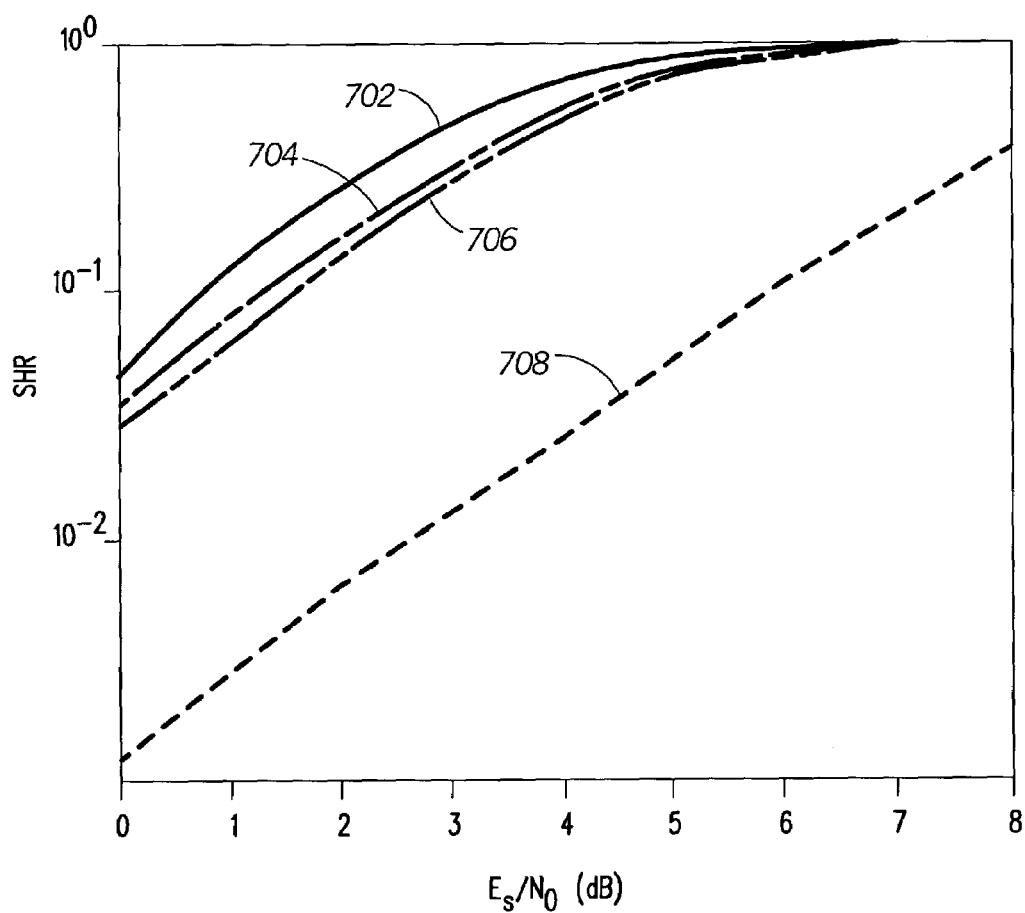
FIG. 7 is a graph showing static sync detection performance with frequency error.

FIG. 7 shows the sync hit rate (SHR) on the y-axis vs. static $E_s/N_0$ on the x-axis, where $E_s$ represents symbol energy, and $N_o$ represents noise density, for several scenarios. The benchmark is 0 Hz error with L=0 (frequency set {0} Hz), which has the best performance as represented by solid curve 702 in FIG. 7. For 300 Hz error with L=0, the SHR degrades severely as the sync correlator produces very little energy at its output as shown by curve 708 in FIG. 7. When the frequency set {−200, 0, +200} Hz (L=1) is incorporated as shown by curve 704 in FIG. 7, the SHR comes to within about 0.5 dB from the benchmark. To handle 500 Hz error, the frequency set {−400, −200, 0, +200, +400} Hz (L=2) must be used as shown by curve 706 in FIG. 7. As long as the frequency set is appropriately selected, more frequency error can be handled and little loss will be suffered from secondary distortions, provided that the offset is small compared to the symbol rate.

Figure 8:
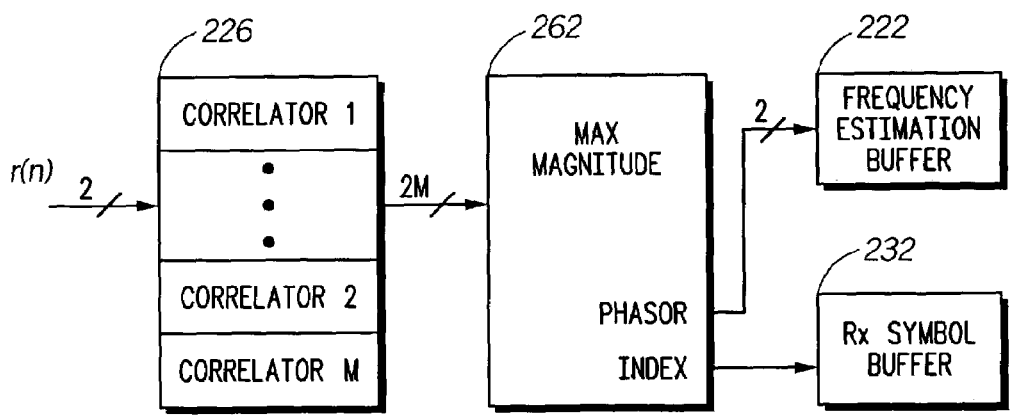
FIG. 8 is a block diagram showing a frequency offset estimator buffering scheme.

The sync symbol correlator 220 and combiner 240 of the invention are robust in the presence of small frequency errors. The algorithms utilized by the sync symbol correlator 220 and combiner 240 are efficient and build on the Goertzel-based symbol correlator. In addition to detecting the sync word 310 when frequency error is present, it is desirable to define a way to estimate frequency offset from the received signal in order to track out the error. The frequency offset estimator 260 builds on the same basic idea. The symbol correlator outputs, when synchronized in time, and after phase correction, rotate in phase according to the frequency offset of the received signal. Thus, for the frequency offset estimator 260, the following vector $\vec{x}$ applies:

Equation 15:

$$\vec{x} = \begin{bmatrix} \lambda(n_0 - 127N_s, u_0) \\ -\lambda(n_0 - 126N_s, u_1) \\ \vdots \\ -\lambda(n_0 - 120N_s, u_7) \\ \lambda(n_0 - 119N_s, \hat{u}_8) \\ -\lambda(n_0 - 118N_s, \hat{u}_9) \\ \vdots \\ \lambda(n_0 - N_s, \hat{u}_{126}) \\ -\lambda(n_0, \hat{u}_{127}) \end{bmatrix},$$

where we assume 128 symbols in the FSK data slot 312, for example. In this case, the time $n_0$ represents the end of the 128$^{th}$ symbol within the slot. The first eight symbols $u_0 u_1 \ldots u_7$ are the known Sync symbols, and the remaining symbols $\hat{u}_8 \hat{u}_9 \ldots \hat{u}_{127}$ are estimates of the transmitted data symbols. The symbol estimates are based on either the raw received symbols or the error-corrected symbols. The raw symbol method is generally much simpler to implement. FIG. 8 shows a block diagram of how this vector is formed for the raw received symbol approach, during the data portion 316 of the FSK slot 312. For M-ary FSK, a bank of M symbol correlators 226 operate once per synchronized symbol interval, thus producing M complex correlations per symbol interval, where each complex correlation corresponds to a particular frequency in the M-ary FSK alphabet. Note that these correlations are the same as those described by equation 6. However, for the data portion 316 of the slot, since symbol timing has already been established, it is only necessary to compute these once per symbol interval, so the recursive computation of equation 8 need not be used. For each symbol interval, a peak magnitude search 262 is performed over the M correlations, and the peak indices are stored in the raw received symbol buffer 232. The complex correlation associated with the raw received symbol index is stored in a frequency estimation buffer 222. Upon receiving the last data symbol within the slot, the frequency estimation buffer 222 is phase-corrected, thus forming the vector $\vec{x}$ of equation 15.

The frequency estimator 260 may use the 128 point Fast Fourier Transform (FFT) and take the magnitude squared as follows:

Equation 16:

$$P_x(l) = \left| \sum_{k=0}^{127} x_k \exp\left(-j\frac{2\pi kl}{128}\right) \right|^2 \quad l = 0, 1, \ldots, 127$$

The frequency estimator 260 estimates the frequency offset according to a fractional argument that maximizes $P_x(l)$ over the region corresponding to, for example, [−500, 500] Hz. In this example, the frequency resolution of this FFT is 25 Hz per bin.

The quality estimator 280 may attach a measure of quality to the estimate, according to the measurement of the signal to noise ratio (SNR)

Equation 17:

$$SNR = \frac{\sum_{l \in L_1} P_x(l)}{\sum_{l \notin L_1} P_x(l)}$$

where $L_1$ defines a region ±200 Hz, or ±8 bins, about the point $l_0$. This $l_0$ is computed as the frequency bin index, confined to the region [−500, 500] Hz, which maximizes $P_x(l)$. Instead of taking only the maximum frequency component, the system sums up the signal in a narrow bandwidth about the peak. This technique maintains a good SNR in the fast fading case, where energy is spread out about the nominal offset.

In order to pass a frequency offset estimate, a sync word hit must occur during the specified slot, and SNR must be greater than a predetermined threshold, for example, 0.3. This SNR measurement is a simple and effective method for detecting bad measurements and discarding them.

FIG. 9 summarizes the performance of the frequency offset estimator 260 and quality estimator 280. Each table entry encapsulates the results of 500 simulated data slots. The measurements are extremely accurate, even though non-error-corrected symbols are used.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

We claim:

1. A method for using a receiver to achieve timing synchronization during acquisition of a signal, the method comprising the steps of:
    receiving a signal from the transmitter containing a plurality of data slots and a sync word within each transmitted data slot;
    forming multiple correlations at each of a plurality of time instants, each of said multiple correlations corresponding to a selected sync symbol interval relative to a current time instant, by correlating the received signal with a sinusoid of an expected frequency for each of the selected sync symbol intervals;
    gathering the multiple correlations at each time instant;
    phase correcting the multiple correlations in accordance with an FSK modulation index and a known sync symbol pattern, thus forming a vector of multiple phase corrected sync symbol correlations;
    computing at each time instant a discrete-time Fourier transform of the vector over a set of candidate offset frequencies;
    forming a sync correlation signal according to a maximum discrete-time Fourier transform amplitude at each time instant among the set of candidate offset frequencies;
    comparing the sync correlation signal to a threshold at each time instant, wherein the threshold is proportional to energy in the received signal over the time span of a sync signal relative to a current time instant; and
    upon detecting that the sync correlation signal has exceeded the threshold, locating a peak of the sync correlation signal and establishing symbol timing in accordance with the peak.

2. The method of claim 1, further comprising tracking a transmitter's frequency by estimating a frequency offset from the received signal.

3. The method of claim 2, further comprising the step of tracking frequency synchronization in the received signal based on the estimated frequency offset.

4. A digital communication receiver capable of achieving time synchronization in the presence of frequency error, the receiver comprising:
    a receiving mechanism adapted to receive a signal containing a plurality of data slots with a sync word within each transmitted data slot;
    a correlator for forming multiple correlations, each of said multiple correlations corresponding to a selected sync symbol interval, and for correlating the received signal with a sinusoid of an expected frequency for each of the selected sync symbol intervals;
    a combiner for gathering and combining the multiple correlations over a set of candidate offset frequencies according to an FSK modulation index and a known sync symbol pattern;
    a peak detector for forming a sync correlation signal according to a maximum combiner output amplitude among the candidate offset frequencies at each time instant;
    a threshold detector for comparing the sync correlation signal to a threshold at each time instant; and
    a symbol timing estimator for establishing symbol timing in accordance with a peak of the sync correlation signal upon detecting that the sync correlation signal has exceeded the threshold.

5. The digital communication receiver of claim 4, further comprising a frequency offset estimator for estimating a frequency offset of the received signal in order to track frequency synchronization after signal acquisition.

6. The digital communication receiver of claim 5, further comprising an error tracking mechanism for tracking frequency synchronization after signal acquisition.

7. A method for achieving frequency synchronization in a digital communication receiver having a symbol timing mechanism, the method comprising:
    formulating a vector of complex valued symbol correlations, where each vector element is a correlation of a received signal with a sinusoid of a known or estimated symbol frequency during each of a plurality of symbol intervals, and wherein each symbol interval is determined according to the symbol timing derived from the symbol timing mechanism;

basing symbol frequencies on known sync symbols and estimated data symbols during a remainder of a time slot;

phase-correcting the vector of complex valued symbol correlations according to an FSK modulation index and estimated symbol pattern for each time slot;

computing a discrete-time Fourier transform vector of the vector of complex valued symbol correlations;

estimating a frequency offset of the received signal according to a location of the peak magnitude of the Fourier transform vector; and computing a quality metric for the frequency offset estimate according to a signal-to noise ratio computed from the magnitude of the Fourier transform vector.

8. The method of claim 7, further comprising:

determining the signal-to-noise ratio for the frequency offset estimate by summing up the signal in a selected narrow bandwidth about the peak and discarding the frequency offset estimate if the signal-to-noise ratio is below a pre-determined threshold.

9. An apparatus for achieving timing synchronization during acquisition of signal and for achieving frequency synchronization after acquisition of the signal, the apparatus comprising:

a receiving mechanism adapted to receive a signal containing a plurality of data slots with a sync word within each transmitted data slot;

a correlator for forming multiple correlations, each of said multiple correlations corresponding to a selected sync symbol interval, and correlated with a sinusoid of an expected frequency for each of the selected sync symbol intervals;

a combiner for gathering and combining the multiple correlations over a set of small offset frequencies according to an FSK modulation index and a known sync symbol pattern;

a peak detector for forming a sync correlation signal at each time instant according to a maximum combiner output amplitude among the offset frequencies;

a threshold detector for comparing the sync correlation signal to a threshold at each time instant;

a symbol timing estimator for establishing symbol timing in accordance with a peak of the sync correlation signal upon detecting that the sync correlation has exceeded the threshold;

a frequency offset estimator for formulating an offset estimate using known and estimated symbols and for calculating a frequency offset estimate; and a quality estimating tool for determining a quality of the frequency offset estimate using a signal-to-noise ratio calculation.

* * * * *